United States Patent [19]

Takehara et al.

[11] Patent Number: 5,142,513
[45] Date of Patent: Aug. 25, 1992

[54] MAGNETO-OPTICAL STORAGE MEDIUM AND MAGNETO-OPTICAL OVERWRITE SYSTEM WITH MAGNETIC CHARACTERISTIC CHANGE BY VARIATION OF THERMAL CONDITION FOR RECORDING INFORMATION

[75] Inventors: Hideaki Takehara; Shin Miyajima, both of Fujisawa; Yasuo Shibata, Sagamihara, all of Japan

[73] Assignee: Victor Company of Japan, Ltd., Yokohama, Japan

[21] Appl. No.: 510,703

[22] Filed: Apr. 20, 1990

Related U.S. Application Data

[63] Continuation-in-part of Ser. No. 407,340, Sep. 14, 1989, abandoned.

[30] Foreign Application Priority Data

Apr. 20, 1989 [JP] Japan .................. 1-100620

[51] Int. Cl.⁵ .................. G11B 7/12; G11B 11/12; G11B 13/04
[52] U.S. Cl. .................. 369/13; 360/59; 365/122; 369/110
[58] Field of Search ........... 369/13, 14, 275.2, 284, 369/286, 288, 110; 360/59, 114, 131, 135; 365/122; 428/694, 900

[56] References Cited

U.S. PATENT DOCUMENTS

| | | | |
|---|---|---|---|
| 4,658,388 | 4/1987 | Ishiwatari et al. | 369/13 |
| 4,771,347 | 9/1988 | Horimai et al. | 360/59 |
| 4,794,560 | 12/1988 | Bell et al. | 369/13 |
| 4,878,132 | 10/1989 | Aratani et al. | 369/13 |
| 4,908,809 | 3/1990 | Tadokoro et al. | 369/13 |

FOREIGN PATENT DOCUMENTS

| | | |
|---|---|---|
| 63-48637 | 3/1988 | Japan . |
| 63-205835 | 8/1988 | Japan . |
| 63-249951 | 10/1988 | Japan . |
| 63-249953 | 10/1988 | Japan . |
| 63-268103 | 11/1988 | Japan . |
| 63-269303 | 11/1988 | Japan . |

OTHER PUBLICATIONS

Electronics, Apr. 16, 1987, p. 33.

*Primary Examiner*—Hoa Nguyen
*Attorney, Agent, or Firm*—Fleit, Jacobson, Cohn, Price, Holman & Stern

[57] ABSTRACT

A magneto-optical storage medium and overwrite system comprises a first magnetic layer (reading/writing layer) (3), a second magnetic layer (auxiliary layer) (5) and a third magnetic layer (initializing layer) (7), each of which is a rare earth-transition metal alloy, and interface layers (4,6) for isolating magnetic exchange interaction between the magnetic layers, respectively. The second magnetic layer is initialized by the magnetization of the third magnetic layer (7) at room temperature. The first magnetic layer and/or the second magnetic layer is heated by a laser beam (P1) for demagnetization and remagnetization. The demagnetized portion of the second magnetic layer is remagnetized to the opposite direction by the demagnetizing field from the periphery. The demagnetized portion of the first magnetic layer is remagnetized to the same direction of the second magnetic layer.

8 Claims, 5 Drawing Sheets

FIG. IA
FIG. IB
FIG. IC
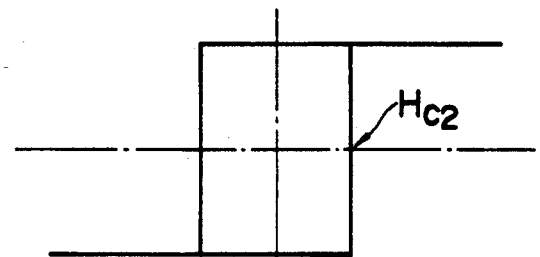
$H_{c2}$
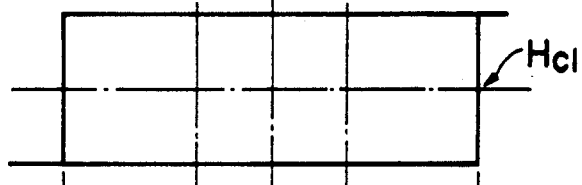
$H_{c1}$
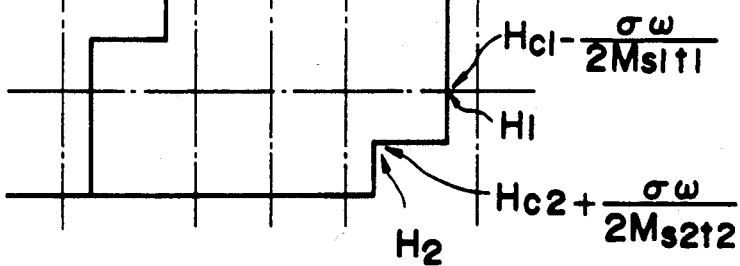
$H_{c1} - \dfrac{\sigma\omega}{2M_{s1}t_1}$
$H_1$
$H_{c2} + \dfrac{\sigma\omega}{2M_{s2}t_2}$
$H_2$

MAGNETO-OPTICAL STORAGE MEDIUM AND MAGNETO-OPTICAL OVERWRITE SYSTEM WITH MAGNETIC CHARACTERISTIC CHANGE BY VARIATION OF THERMAL CONDITION FOR RECORDING INFORMATION

This is a continuation-in-part application of the U.S. application Ser. No. 407,340 filed on Sep. 14, 1989 now abandoned.

BACKGROUND OF THE INVENTION

The present invention relates to a magneto-optical storage medium and magneto-optical overwrite system.

Since high density-reading/writing is possible by utilizing a perpendicular magnetic film as a magnetic layer, many systems utilizing several kinds of magneto-optical storage media have recently been proposed for magneto-optical reading/writing systems in which data are written in a magnetic layer of a magnetic storage medium as a change of magnetization corresponding to the data, i.e. the magnetic layer has magnetization characteristics subject to heat applied thereto, and the data thus written in the magnetic layer is read by utilizing an optical effect such as the Faraday effect or the Kerr effect.

An optical disk memory employing a disk-format magneto-optical medium is interchangeable with respect to a reading/writing apparatus. Much effort is made to research and development of rewritable large capacity file memories and some are already being marketed. However, at present, a rewriting system for such file memories is not adequate, even though some memory systems are claimed rewritable, they are often incapable of direct overwriting.

The memory, accordingly, has such a disadvantage that it is not versatile, compared with, so called, a hard disk apparatus (for example, a Winchester hard disk apparatus) which has widely been used but the disk is built into the apparatus thus not interchangeable.

In order to overcome the disadvantage, several magneto-optical overwrite systems have been proposed, the following two systems being the examples of such.

(1) A magneto-optical overwrite system in which a revolving magneto-optical storage medium is irradiated by a tiny spot of light with constant intensity and the writing bias magnetic field is modulated in magnitude by the data signals to be written.

(2) A magneto-optical overwrite system which employs a magneto-optical storage medium having a first magnetic layer and a second magnetic layer, each of them being composed of an amorphous alloy consisting of a heavy rare earth metal and a transition metal, and the two layers being so laminated that there exists a magnetic exchange interaction therebetween, further the coercive force $Hc_1$ of the first magnetic layer and the coercive force $Hc_2$ of the second magnetic layer have the relationship $Hc_1 > Hc_2$ at a room temperature. Furthermore, the Curie-temperature $Tc_1$ of the first magnetic layer and the Curie-temperature $Tc_2$ of the second magnetic layer have the relationship $Tc_1 < Tc_2$. There is also a means for irradiating the magneto-optical storage medium with a laser beam the intensity of which is modulated into the first intensity level which causes the first magnetic layer being heated to a temperature higher than the Curie-temperature $Tc_1$ and also the second magnetic layer being heated to a temperature higher than the Curie-temperature $Tc_2$, and into the second intensity level which causes the first magnetic layer being heated to a temperature higher than the Curie-temperature $Tc_1$ and also the second magnetic layer being heated to a temperature lower than the Curie-temperature $Tc_2$. The system also comprises a means for focusing the laser beam with respect to said magneto-optical storage medium, an external magnetic field applying means for initializing the second magnetic layer by magnetizing only the second magnetic layer into a predetermined polarity in the thickness direction thereof before the magneto-optical storage medium is irradiated with the laser beam. In a cooling process subsequent to the demagnetization of the both first and second magnetic layers by being heated with the laser beam of the first intensity level, there is a means for causing a new magnetization in the previously demagnetized portion of the second magnetic layer by applying an external bias magnetic field so as to have a new magnetization, the polarity of which is opposite to the predetermined polarity, and for causing the new opposite polarity magnetization in the second magnetic layer being transferred to the previously demagnetized portion of the first magnetic layer by magnetic exchange interaction resulting a portion of the first magnetic layer being magnetized in opposite polarity to the predetermined polarity. The transferred opposite polarity magnetization represents "1" to "0" of binary code. In order to magnetize the portion of the first magnetic layer in a polarity same as the predetermined polarity to represent "0" or "1", the storage medium already initialized is irradiated with the laser beam of the second intensity level so that the only the portion of the first magnetic layer is demagnetized, and when the portion is cooled down, the magnetization having the predetermined polarity at the corresponding portion in the second magnetic layer is transferred to the demagnetized portion of the first magnetic layer by the magnetic exchange interaction. There is also a means for reading out the data written in the first magnetic layer.

In the well known magneto-optical overwrite system (1), the high frequency magnetic field which changes at a high frequency must be generated for high density-writing, since it is required to generate a magnetic field by the data signals to be written.

It is, however, difficult to generate a magnetic field of sufficient strength at a high frequency for fast data transfer.

Furthermore, in the magneto-optical overwrite system (2) employing double-layered films of magnetic exchange interaction, high data transferring speed is realized as data signals are written by an optical modulation means. It is not, however, easy to compose the first and second magnetic layers forming the double-layered films having magnetic exchange interaction therebetween in such a manner that the Curie-temperatures, the compensation temperatures, the coercivity, the magnetizations, the thickness of the films and the wall energy between the layers are controlled so as to have required characteristics with productivity, and repeatability, etc. Furthermore, the two external magnetic field applying means, that is, the means for initializing the second magnetic layer and the means for applying a bias magnetic field for writing data are required. This results in the apparatus becoming bulky.

Then, in the overwrite method (2) employing the magneto-optical storage medium of the double-layered films having magnetic exchange interaction, it is explained hereafter with reference to FIGS. 1A, 1B and 1C how it is difficult to compose such double-layered films of the magneto-optical storage medium to have the required magnetic characteristics. In the first and second magnetic layers of the magneto-optical storage medium having the magnetic exchange interaction to be employed in the overwrite system, when the coercivity and the Curie-temperature of the first magnetic layer at the room temperature are $Hc_1$ and $Tc_1$, respectively and those of the second magnetic layer are $Hc_2$ and $Tc_2$, respectively, the first and second magnetic layers are composed of magnetic materials with the magnetic characteristics in which the following relationships must be established.

$$Hc_1 > Hc_2 \quad (1)$$

$$Tc_1 < Tc_2 \quad (2)$$

Due to the magnetic exchange interaction, the magnetic transition characteristic of the laminated two magnetic layers each of which is composed of amorphous alloy consisting of a heavy rare earth metal (RE) and a transition metal (TE), is different from that of each of the magnetic layers behaving individually.

As is understood by Japanese Jounal of Applied Physics Vol. 20, No. 11, November, 1981, pp. 2089–2095, when the magnetic hysteresis characteristic of a single magnetic layer i.e. the first magnetic layer alone composed of an amorphous alloy consisting of a heavy rare earth metal (RE) and a transition metal (TM) is such as shown in FIG. 1B and the magnetic hysteresis characteristic of the second magnetic layer alone composed of an amorphous alloy consisting of a heavy rare earth metal (RE) and a transition metal (TM) exists, is such as shown in FIG. 1A the magnetic hysteresis characteristic of the laminated layer made up of the first and second magnetic layers is such as shown in FIG. 1C.

This suggests that the range of magnetic transition caused by the first magnetic layer shown in FIG. 1C is smaller than $Hc_1$ by the first magnetic layer alone shown in FIG. 1B and the range of magnetic transition caused by the second magnetic layer shown in FIG. 1C is larger than $Hc_2$ by the second magnetic layer alone shown in FIG. 1A. The following equations (2) and (3) are then established.

$$H_1 = Hc_1 - \sigma\omega/2M_{s1}t_1 \quad (2)$$

$$H_2 = Hc_2 + \sigma\omega/2M_{s2}t_2 \quad (3)$$

(where $t_1$ and $t_2$ are the thicknesses of the respective magnetic layers and $\sigma\omega$ is the interface wall energy.)

In the overwrite system employing the magneto-optical storage medium having the double-layered films, the initializing magnetic field $H_{ini}$ should be satisfy the following equation (4) referring to the magnetic transition ranges $H_1$ and $H_2$ shown in the equations (2) and (3).

$$H_1 > H_{ini} > H_2 \quad (4)$$

The magnetic transition ranges $H_1$ and $H_2$, however, are related to the thicknesses $t_1$ and $t_2$ of respective magnetic layers and the wall energy, etc. as indicated by the equations (2) and (3).

Accordingly, in order to obtain the magnetic transistion ranges $H_1$ and $H_2$ for satisfying the condition of the equation (4), it is required to accurately control the coercivities $Hc_1$ and $Hc_2$ of respective magnetic layers, the saturation intensities of magnetization $Ms_1$ and $Ms_2$, the thicknesses of the films $t_1$ and $t_2$, etc., but, it is extremely critical to do so.

In order to solve the problem described above, the assignee of this application has already proposed a magneto-optical overwrite system comprising a magneto-optical storage medium having a portion composed of first and the second magnetic layers, each of which is composed of an amorphous alloy consisting of a heavy rare-earth metal and a transition metal, an isolation layer interposed between the first and second magnetic layers for isolating magnetic exchange interaction between the layers, a coercivity $H_1$ of the first magnetic layer and a coercivity $H_2$ of the second magnetic layer having a relationship $Hc_1 > Hc_2$ at a room temperature, a Curie-temperature $Tc_1$ of the first magnetic layer being higher than the room temperature and a Curie-temperature $Tc_2$ of the second magnetic layer being higher than the room temperature having a relationship $Tc_1 < Tc_2$ and at least the second magnetic layer being composed of a magnetic material having a compensation temperature below the room temperature and a substrate for supporting the first and second magnetic layers and the isolation layer, means for magnetically initializing both the first and second magnetic layers, an electro-magnetic energy beam being modulated in intensity into a first level and a second level forming a spot in the magneto-optical storage medium, the first level causing spotted portions of the first and second magnetic layers temperatures to rise over the Curie-temperatures $Tc_1$ and $Tc_2$, respectively, so that both of the spotted portions are demagnetized, the second level causing a spotted portion of the first magnetic layer temperature to rise to a temperature between the Curie-temperatures $Tc_1$ and $Tc_2$ so that only the spotted portion of the first magnetic layer is demagnetized, and means for moving the magneto-optical storage medium with respect to the spot of the electro-magnetic energy beam.

The magneto-optical overwrite system already proposed by the assignee of this application therefore does not require a writing bias magnetic field essential in the conventional systems. Furthermore, the initializing magnetic field generating means can be provided anywhere in the system other than the portion irradiated by a laser beam for writing. However, the initializing magnetic field generating means is essential in the system already proposed by the assignee of this application. This results in the system still becoming bulky.

SUMMARY OF THE INVENTION

The object of the present invention is to provide a magneto-optical overwrite system comprising a magneto-optical storage medium composed of first, second and third magnetic layers each of which is composed of an amorphous alloy consisting of a heavy rare-earth metal and a transition metal, an isolation layer composed of a nonmagnetic material interposed between the first and second magnetic layers for isolating magnetic exchange interaction between the first and second magnetic layers, a coercivity $Hc_1$ of the first magnetic layer and a coercivity $Hc_2$ of the second magnetic layer having a relationship $Hc_1 > Hc_2$ at room temperature, a Curie-temperature $Tc_1$ of the first magnetic layer, a Curie-temperature $Tc_2$ of the second magnetic layer and a Curie-temperature $Tc_3$ of the third magnetic layer, each of which is higher than room temperature, having a relationship $Tc_1 < Tc_2 < Tc_3$, the second magnetic layer being composed of a magnetic material having no compensation-temperature at least in the range from the room temperature to its Curie-temperature $Tc_2$, a substrate for supporting the first, second and third magnetic layers and the isolation layer, the third magnetic layer being magnetized in a direction to such an extent, at room temperature, that the magnetization of the third magnetic layer can change a direction of magnetization of the second magnetic layer, but cannot change a direction of magnetization of the first magnetic layer, and that the magnetization of the third magnetic layer does not affect the directions of the magnetizations of the first and the second magnetic layers at writing temperatures, an optical head for projecting the laser beam onto said magneto-optical storage medium by converging said laser beam being modulated in intensity into a first and a second level to form a spot in the magneto-optical storage medium, the first level causing the spotted portion of the first magnetic layer temperature to rise over the Curie-temperature $Tc_1$ and causing the spotted portion of the second magnetic layer temperature to rise below the Curie-temperature $Tc_2$ so that the spotted portion of the first magnetic layer only is demagnetized, the second level causing the spotted portions of the first and second magnetic layers temperature to rise over the Curie-temperatures $Tc_1$ and $Tc_2$ respectively so that both of the portions are demagnetized, and a unit for moving the magneto-optical storage medium with respect to the spot of the laser beam.

After the spotted portions are cooled below the Curie-temperature $Tc_1$, the portion of the first magnetic layer spotted by the first level is magnetized in a direction identical to the direction of the magnetization of the first magnetic layer, and the portion of the first magnetic layer spotted by the second level is magnetized in a direction opposite to the direction of the magnetization of the first magnetic layer.

The term "overwriting" in this specification means that regardless of existence of a first data already written or not in the storage medium, a new second data is written over the position of the first data without having a positive erasing process applied to the position prior to the writing of the new second data. In short, writing of new data is not dependent to or subject to the condition of the previously written data.

BRIEF DESCRIPTION OF THE DRAWINGS

FIGS. 1A, 1B and 1C are examples of magnetic hysteresis-curves for explaining the prior art;

DETAILED DESCRIPTION OF THE PREFERRED EMBODIMENTS

The preferred embodiments according to the present invention will now be explained in detail with reference to the accompanying drawings.

Figure 2:
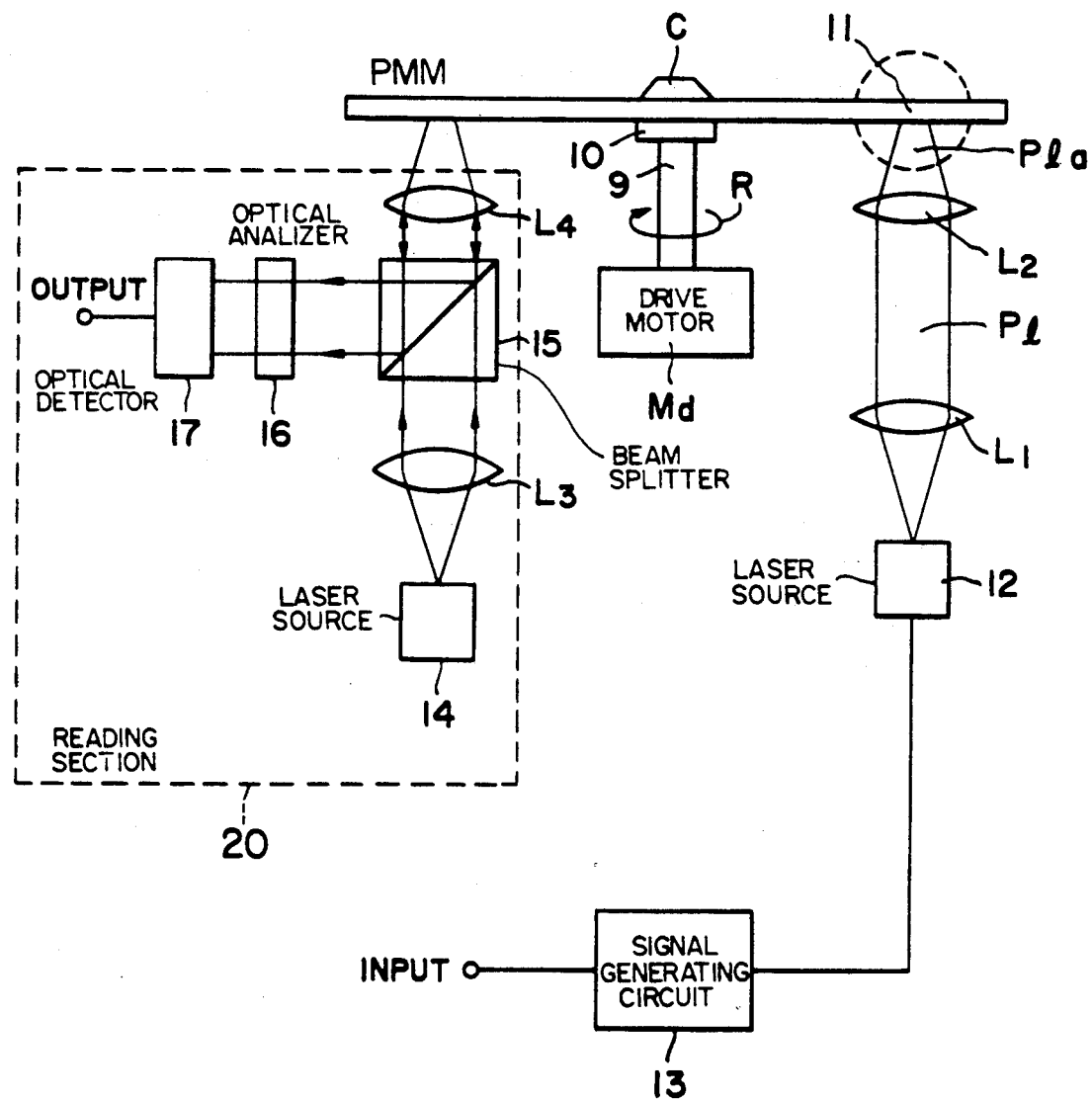
FIG. 2 is a schematic block diagram of a reading/writing apparatus in a magneto-optical overwrite system of the present invention.
Figure 3:
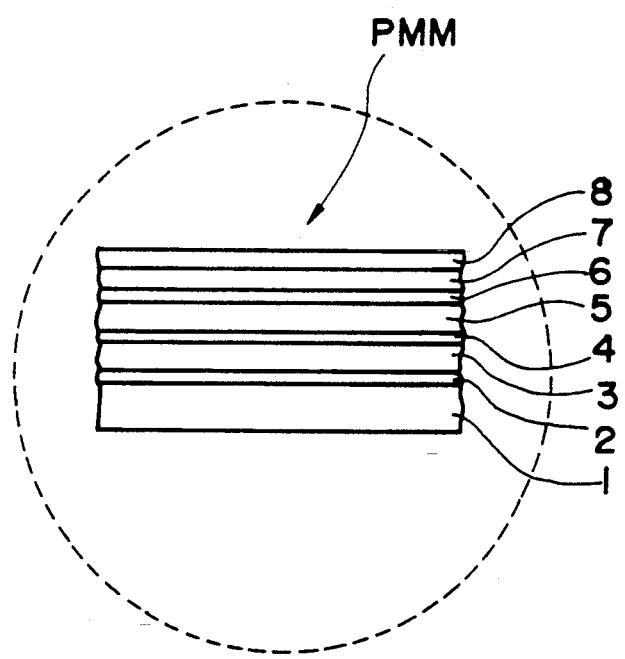
FIG. 3 is a schematic cross-sectional view of a magneto-optical storage medium in a magneto-optical overwrite system of the present invention.
Figure 4:
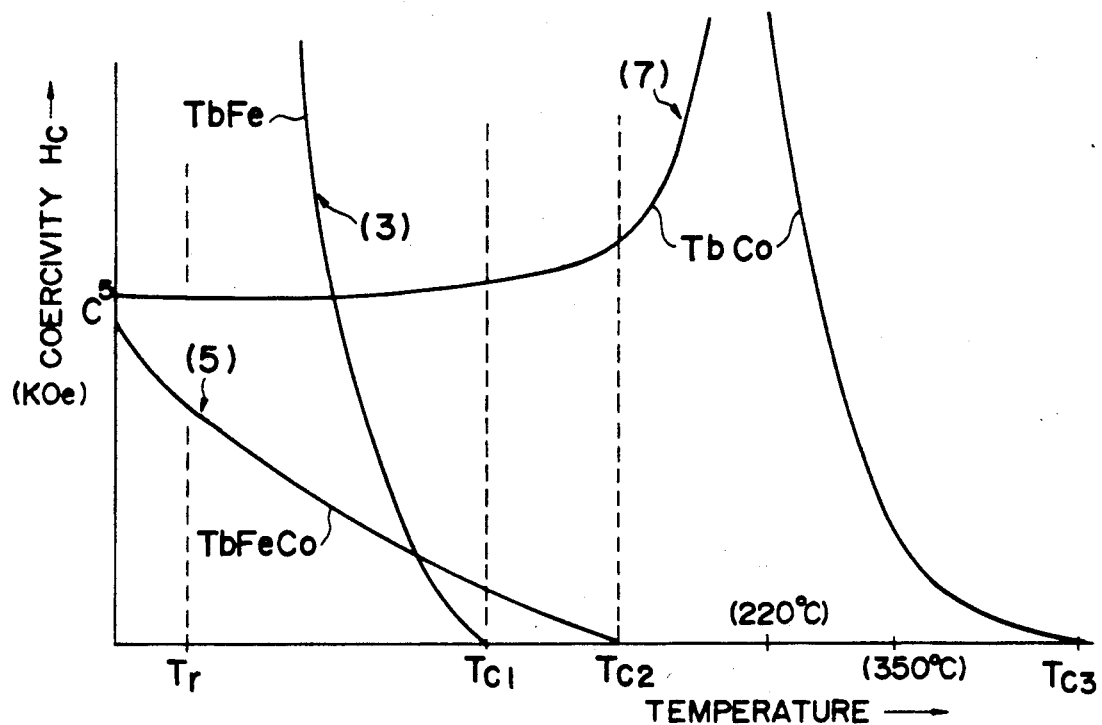
FIGS. 4 and 5 are graphs showing magnetic characteristics of respective components used in the magneto-optical storage medium in a magneto-optical overwrite system of the present invention.
Figure 5:
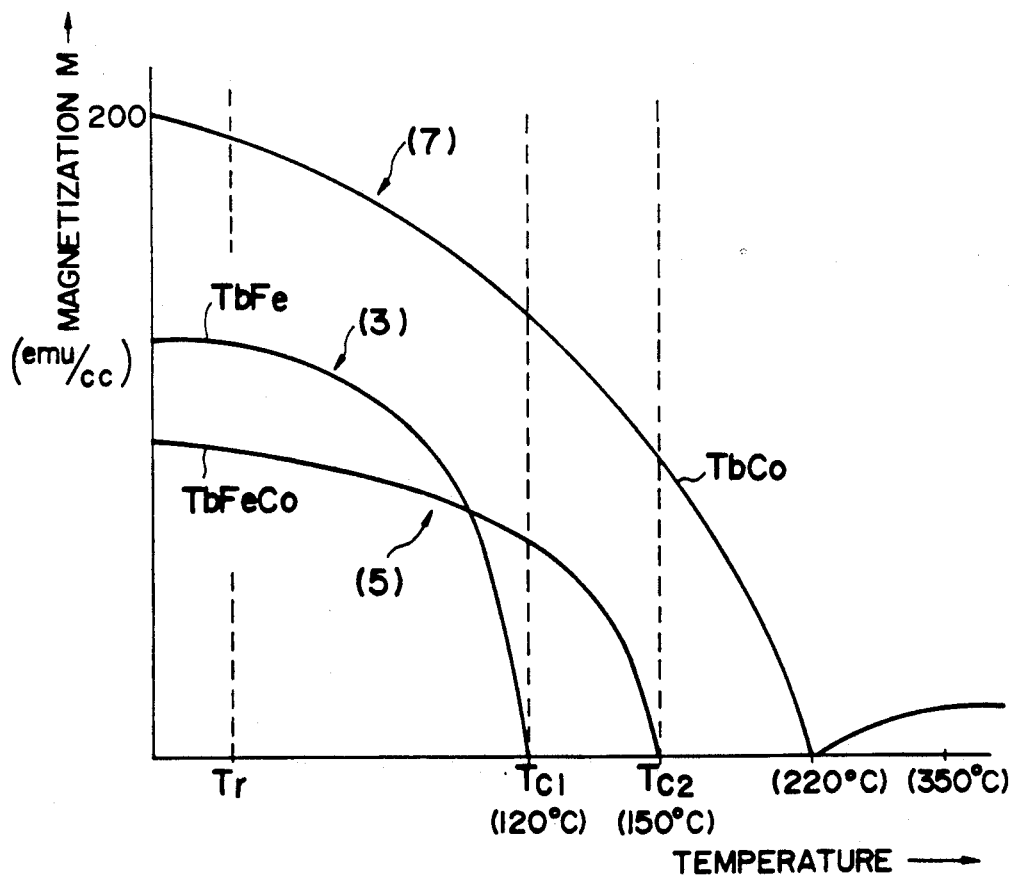

The magneto-optical overwrite system shown in FIG. 2 is composed of a drive motor Md, a rotary shaft 9, a turn table 10, a magneto-optical storage medium PMM (The configuration is shown in FIG. 3), a clamper C, an objective lens $L_2$ (a condenser lens), a diverging lens $L_1$, a laser source 12, a signal generating circuit 13.

The storage medium PMM is set on the turn table 10 and fixed by the clamper C. The drive motor Md rotates at a specific rotating speed in the direction depicted by an arrow mark R to rotate the storage medium PMM with the turn table 10.

The laser source 12 provided in an optical head (an optical pickup including the collimating lens $L_1$ and the objective lens $L_2$) emits a laser beam which is made in parallel (the beam Pl) by the collimating lens $L_1$ and converged (the beam Pla) by the objective lens $L_2$. The converged beam Pla produces a tiny spot 11 on the storage medium PMM by transferring the optical head in a perpendicular direction to the direction of the recording track on the storage medium PMM in the case of writing.

The converged beam Pla is modulated accordingly with the data to be written in the case of writing, whereas in the case of reading, the converged beam Pla is made constant and the intensity thereof is made weaker than that in the case of writing.

The storage medium PMM shown in FIG. 3 is composed of a transparent substrate 1, an intermediate layer 2 (a Kerr effect-enhancement and protection layer), the first magnetic layer 3 composed of an amorphous alloy consisting of a heavy rare earth metal and a transition metal, the second magnetic layer 5 composed of an amorphous alloy consisting of a heavy rare-earth metal and a transition metal, the first layer 4 for isolating exchange interaction between the first and the second magnetic layers 3 and 5, the third magnetic layer 7 composed of an amorphous alloy consisting of a heavy rare-earth metal and a transition metal, the second layer 6 for isolating exchange interaction between the second and the third magnetic layers 5 and 7 and a protection layer 8.

The intermediate layer 2 and the second layer 6 are the components which are preferably provided for practical purposes although not required in principle for overwriting the storage medium PMM by the magneto-optical overwrite system of the present invention.

In the storage medium PMM which is composed as shown in FIG. 3 and used in the magneto-optical overwrite system of the present invention, the first, second and third magnetic layers 3, 5 and 7 have a relationship, in that the coercivity $Hc_1$ of the first magnetic layer 3 and the coercivity $Hc_2$ of the second magnetic layer 5 have the relationship $Hc_1 > Hc_2$ at room temperature and the Curie-temperature $Tc_1$ of the first magnetic layer 3, the Curie-temperature $Tc_2$ of the second magnetic layer 5 and the Curie-temperature $Tc_3$ of the third magnetic layer 7 have the relationship $Tc_1 < Tc_2 < Tc_3$.

Furthermore, the second magnetic layer 5 is composed of a magnetic material (ferromagnetic material) having no compensation temperature at least in the range from the room temperature to its Curie-temperature $Tc_2$. The third magnetic layer 7 is magnetized to such an extent that, at room temperature, the magnetization of the third magnetic layer 7 can change a direction of the magnetization of the second magnetic layer 5, but cannot change that of the first magnetic layer 3, and that the magnetization of the third magnetic layer 7 does not effect the directions of the magnetization of the first and second magnetic layers 3 and 5 at temperatures for data-writing higher than room temperature.

An example of the actual combination of the storage medium PMM is indicated in Table 1, which is used for reading and writing and composed as shown in FIG. 3, that is, each of the layers of the composing portions 2 to 8 are sequentially formed on the transparent substrate 1 which is composed of a transparent plastic.

TABLE 1

| Composing portion | Composing material | Thickness of the layer |
| --- | --- | --- |
| The intermediate layer 2 | TaOx | 65 nm |
| The first magnetic layer 3 | TbFe | 100 nm |
| The first layer 4 | Ta | 5 nm |
| The second magnetic layer 5 | TbFeCo | 100 nm |
| The second layer 6 | Ta | 5 nm |
| The third magnetic layer 7 | TbCo | 100 nm |
| The protection layer 8 | TaOx | 65 nm |

In the example of the actual combination of the storage medium PMM indicated in Table 1, the film of tantalum with the thickness of 5 nm as a nonmagnetic material is used for the first layer 4 for isolating exchange interaction between the first and the second magnetic layers 3 and 5 and the second layer 6 for isolating exchange interaction between the second and third magnetic layers 5 and 7.

As is explained above, the storage medium PMM used for the magneto-optical overwrite system of the present invention comprises the first layer 4 (hereinafter called the first isolation layer 4) for isolating exchange interaction between the first and second magnetic layers 3 and 5 and the second layer 6 (hereinafter called the second isolation layer 6) for isolating exchange interaction between the second and third magnetic layers 5 and 7, so that the magnetic transition characteristics of the magnetic layers 3, 5 and 7 are almost equal to the condition that the stacked magnetic layers 3, 5 and 7 magnetically behave individually without exchange interaction therebetween.

The initializing magnetic field $H_0$ required for reversal of the second magnetic layer 5 only is a magnitude which satisfies under room temperature the following equation (5)

$$Hc_1 > H_0 > Hc_2 \qquad (5)$$

where the coercivity of the first magnetic layer 3 is $Hc_1$ and the coercivity of the second magnetic layer 5 is $Hc_2$, and they have a relationship $Hc_1 > Hc_2$ at room temperature. In other words, the required initializing magnetic field is allowed to fall between the coercivities $Hc_1$ and $Hc_2$.

As is understood from the foregoing, the magneto-optical overwrite system of the present invention overcomes the disadvantage of the conventional overwrite system employing the magneto-optical storage medium having the double-layered films described with reference to the equations (2) to (4), that is, in order to obtain the magnetic transition ranges $H_1$ and $H_2$ for satisfying the condition of the equation (4), it is required to accurately control the coercivities $Hc_1$ and $Hc_2$ of respective magnetic layers, the saturation intensities of magnetization $Ms_1$ and $Ms_2$, the thickness of the films $t_1$ and $t_2$, etc. This advantage of the magneto-optical overwrite system of the present invention is very useful concerning with the production of the magneto-optical storage medium and the reading/writing system.

The coercivity $Hc_3$ of the third magnetic layer 7 is made large enough to be always magnetized in the fixed direction and intensity at the room temperature Tr. Therefore, by means of the magnetic field ($H_0$) generated due to the magnetization of the third magnetic layer 7, the second magnetic layer 5 is magnetically oriented in the direction of the magnetization of the third magnetic layer 7. That is to say, the third magnetic layer 7 behaves as an initializing magnetic field applying layer, so that the magneto-optical overwrite system of the present invention does not require an external magnetic field generating means conventionally required for applying the initializing magnetic field to the magneto-optical storage medium PMM.

Next, the magneto-optical overwrite system of the present invention will be explained with reference to FIG. 2 wherein the storage medium (a disk-like magneto-optical storage medium, hereinafter called a disk) PMM, described with reference to FIG. 3, is rotated in the direction depicted by the arrow mark R at the specific rotating speed by the drive motor Md under the control of a rotation control circuit not shown.

In FIG. 2, the signal generating circuit 13 generates a signal having low or high level to subject the laser source 12 to emit a beam having the first optical intensity or the second optical intensity stronger than the first accordingly with the first or the second level of a binary-coded input signal to be written. The laser source 12 thus emits the beam Pl which is converged to be the beam Pla. The coveraged beam Pla is incident to the storage medium PMM at the transparent substrate 1 side thereof to produce the tiny laser spot 11 on the respective portions of the first and second magnetic layers 3 and 5.

In the portions of the storage medium PMM apart from the spot 11, the third magnetic layer 7 behaves as the initializing magnetic field applying layer at room temperature Tr. The second magnetic layer 5 is thus magnetically oriented by the magnetic field ($H_0$) generated in the third magnetic layer 7 in the direction of the magnetization thereof.

Figure 6:
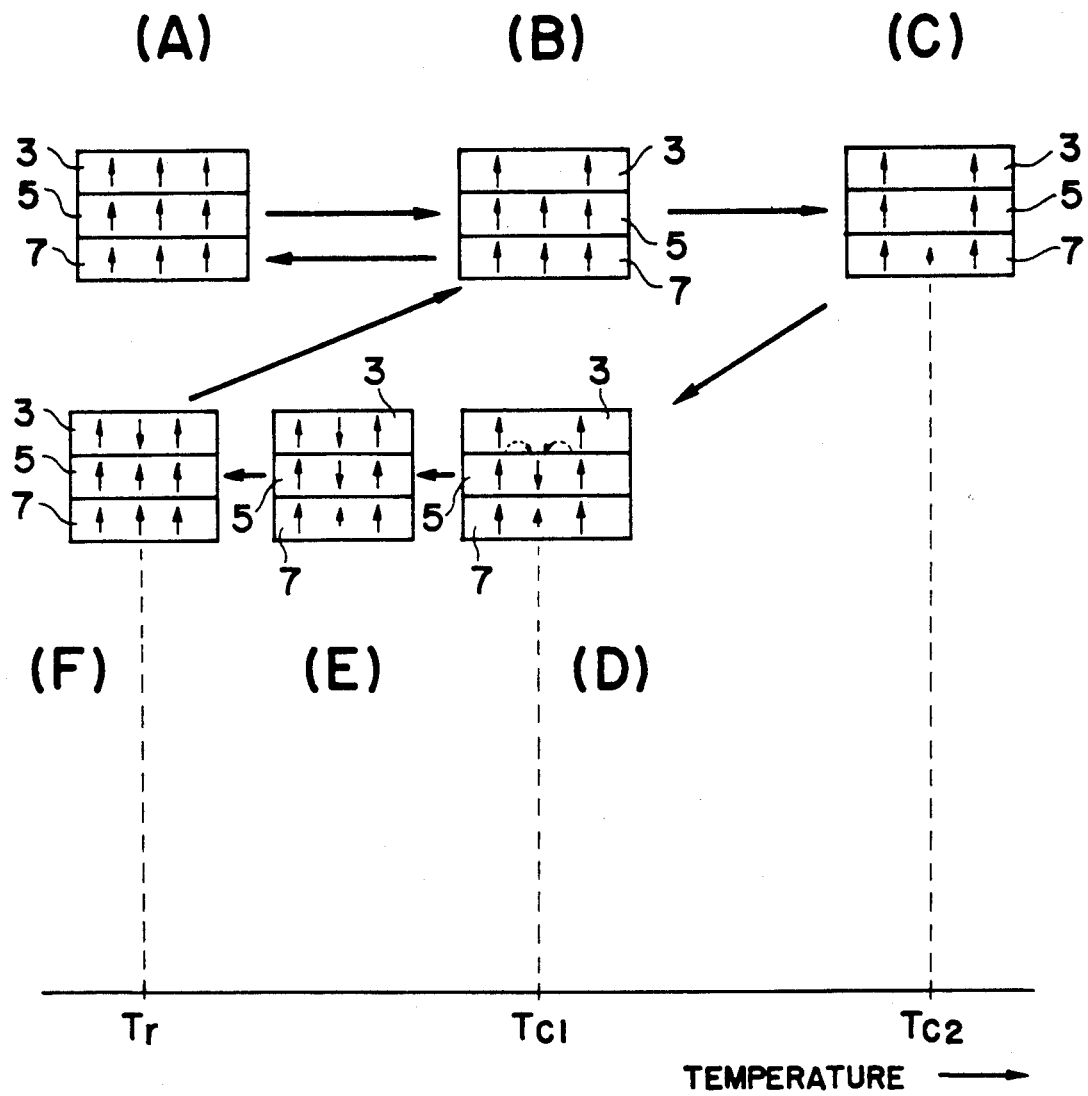
FIG. 6 is a diagrammatic view for explaining an operational principle of the magneto-optical overwrite system of the present invention.

Therefore, the magnetization of the second and third magnetic layers 5 and 7 at room temperature Tr are as depicted by (A) and (F) of FIG. 6. That is, only the second magnetic layer 5 is initially magnetized (perpendicularly magnetized) in the thickness direction thereof and the magnetization direction of the third magnetic layer 7 by the initializing magnetic field ($H_0$) generated by the magnetization thereof. (A) to (F) of FIG. 6 show schematic and cutaway views of the storage medium PMM sectioned perpendicularly to a writing track. The center portion of each of the layers denotes the writing track, while the right and left portions thereof denote the portions not irradiated with the converged beam Pla. Each of arrow marks shown in (A) to (F) of FIG. 6 denotes the intensity and the direction of the magnetization.

The initializing magnetic field $H_0$ is arranged to satisfy the following equation (5) at the room temperature Tr.

$$Hc_1 > H_0 > Hc_2 \qquad (5)$$

where the coercivity of the first magnetic layer 3 is $Hc_1$ and the coercivity of the second magnetic layer 5 is $Hc_2$, and they have a relationship $Hc_1 > Hc_2$ at room temperature. Therefore, only the second magnetic layer 5 of the disk PMM is magnetically oriented in the magnetization direction of the third magnetic layer 7 by the initializing magnetic field $H_0$.

The overwrite operation of the magneto-optical overwrite system of the present invention will be explained with reference to FIG. 6.

First in the state shown in (A) of FIG. 6, the intensity of the laser beam P1 is controlled to a level which allows the laser spot 11 to heat the respective portions of the first, second and third magnetic layers 3, 5 and 7 so as to raise the temperatures of the layers together higher than the Curie-temperature $Tc_1$ of the first magnetic layer 3 but substantially lower than the Curie-temperature $Tc_2$ of the second magnetic layer 5, the respective Curie-temperatures $Tc_1$, $Tc_2$ and $Tc_3$ of the magnetic layers 3, 5 and 7 having relationship $Tc_3 > Tc_2 > Tc_1$.

Thus the portion of the first magnetic layer 3 corresponding to the laser spot 11 is demagnetized as shown in (B) of FIG. 6.

In the disk PMM as it turns, the respective portions of the first, second and third magnetic layers 3, 5 and 7 leave the position of the laser spot 11 so as to be in the cooling process where the temperatures of the magnetic layers 3, 5 and 7 are gradually lowered to room temperature. In this cooling process the demagnetized portion of the first magnetic layer 3 shown in (B) of FIG. 6 is remagnetized in the upward direction depicted by an arrow mark as shown in (A) of FIG. 6 which is the same direction of the magnetization of the second magnetic layer 5.

In the figures, if the direction of the magnetization of the first magnetic layer 3 is in the upward direction, this is defined as the code "0" being written on the first magnetic layer 3, whereas downward direction "1". Therefore, the portion of the first magnetic layer 3 corresponding to the laser spot 11 is written with the code "0" in the state as shown in (A) of FIG. 6 after the process moves on as shown in (B) of FIG. 6 from (A) of FIG. 6, then again to (A) of FIG. 6.

In the case where the portion of the first magnetic layer 3 corresponding to the laser spot 11 has been written with the code "1" as shown in (F) of FIG. 6, when that portion is heated up to the state of (B) of FIG. 6 and then cooled, that portion is rewritten with the code "0" as shown in (A) of FIG. 6.

Next, the intensity of the laser beam P1 is controlled to a level which allows the laser spot 11 to heat the respective portions of the first, second and third magnetic layers 3, 5 and 7 so as to raise the temperatures of the layers together higher than the Curie-temperature $Tc_2$ of the second magnetic layer 5, but substantially lower than the Curie-temperature of the third magnetic layer 7.

Thus, the respective portions of the first and second magnetic layers 3 and 5 corresponding to the laser spot 11 are demagnetized as shown in (C) of FIG. 6.

In the disk PMM as it turns, the respective portions of the first, second and third magnetic layers 3, 5 and 7 leave the position of the laser spot 11 so as to be in the cooling process where the temperatures of the magnetic layers 3, 5 and 7 are gradually lowered to room temperature. In this cooling process the demagnetized portion of the second magnetic layer 5 shown in (C) of FIG. 6 is remagnetized in the downward direction depicted by an arrow mark as shown in (D) of FIG. 6 by the reverse magnetic fields which are depicted by dotted arrow marks and are generated by the magnetization of the peripheral portions of the demagnetized portion of the second magnetic layer 5 in the temperature range so that the temperature thereof is gradually lowered to less than the Curie-temperature $Tc_2$ and higher than the Curie-temperature $Tc_1$.

In (D) of FIG. 6, the intensity of the magnetization of the third magnetic layer 7 is so small that the intensity of the magnetic field generated by the magnetization of the third magnetic layer 7 is smaller than the intensity of the reverse magnetic fields which are depicted by the dotted arrow marks and are generated by the magnetization of the peripheral portions of the demagnetized portion of the second magnetic layer 5. Therefore, the demagnetized portion of the second magnetic layer 5 is remagnetized in the downward direction depicted by the arrow mark as shown in (D) of FIG. 6 by the reverse magnetic fields.

The aforementioned operation is securely performed as the second magnetic layer 5 has no compensation temperature between the Curie-temperature $Tc_1$ of the first magnetic layer 3 and the Curie-temperature $Tc_2$ of the second magnetic layer 5.

Next, the demagnetized portion of the first magnetic layer 3 is newly magnetized in the downward direction depicted by an arrow mark as shown in (E) of FIG. 6 by the downward magnetization of the remagnetized portion of the second magnetic layer 5 as shown in (D) of FIG. 6, when the temperature of the demagnetized portion of the first magnetic layer 3 is further lowered below the Curie-temperature $Tc_1$.

The reason why the demagnetized portion of the first magnetic layer 3 is newly magnetized, not by the magnetic fields of the peripheral portion of the demagnetized portion, but by the downward remagnetized portion of the second magnetic layer 5, is that the saturation intensity of the magnetization of the first magnetic layer 3 is smaller than that of the second magnetic layer 5.

When the temperature of the aforementioned portions is lowered to room temperature Tr, the downward magnetized portion or the second magnetic layer 5 is initialized as magnetized upward as shown in FIG. 6F by the initializing magnetic field $H_0$ generated by the magnetization of the third magnetic layer 7 which functions as the initializing magnetic field generating means. Therefore, the first magnetic layer 3 is magnetized downward, that is, written with the code "1".

The signal thus written on the disk PMM according to the present invention is reproduced by irradiating the disk PMM at the first magnetic layer 3 side thereof with a beam for reading by means of the conventional reading section 20 shown in FIG. 2, which has a laser source 14, a collimating lens $L_3$, a beam splitter 15, an objective lens $L_4$, an optical analizer 16 and an optical detector 17. The intensity of the beam for reading is set as further weaker than the intensity of the first beam in the case of writing such that the respective temperatures of the first, second and third magnetic layers 3, 5 and 7 do not reach the Curie-temperature $Tc_1$ of the first magnetic layer 3.

As is understood from the foregoing, the external magnetic field applying means, that is, the means for initializing the second magnetic layer and the means for applying a bias magnetic field for data-writing are eliminated from the magneto-optical overwrite system of the present invention.

We claim:

1. A magneto-optical storage medium comprising:

first, second and third magnetic layers, said first and third layers being comprised of an amorphous alloy consisting of heavy rare-earth metal and a transition metal, and said second magnetic layer comprising an amorphous alloy including a heavy rare-earth metal and a transition metal having no compensation temperature at least in the range of the room temperature to its Curie-temperature Tc2, said third magnetic layer being magnetized in a direction and to such an extent that, at room temperature, the magnetization of the third magnetic layer will change a direction of magnetization of said second magnetic layer, but will not change a direction of a magnetization of said first magnetic layer, and that the magnetization of the third magnetic layer does not effect the directions of magnetization of said first and said second layers at said temperature Tc2;

an isolation layer comprised of a nonmagnetic material interposed between said first and second magnetic layers for isolating magnetic exchange interaction between said first and second magnetic layers;

a coercivity Hc1 of said first magnetic layer and a coercivity Hc2 of said second magnetic layer and a coercivity Hc3 of said third magnetic layer having a relationship Hc1>Hc3>Hc2 at room temperature;

a Curie-temperature Tc1 of said first magnetic layer, said Curie temperature Tc2 of said second magnetic layer and a Curie temperature Tc3 of said third magnetic layer, each of which is higher than the room temperature, having a relationship Tc1<Tc2<Tc3; and a substrate for supporting said first, second and third magnetic layers and said isolation layer.

2. A magneto-optical storage medium as claimed in claim 1, and further comprising:

an intermediate layer of nonmagnetic material interposed between said substrate and said first magnetic layer; and a second isolation layer of a nonmagnetic material interposed between said second and third magnetic layers.

3. A magneto-optical storage medium as claimed in claim 1, wherein:

said isolation layer comprises tantalum as said nonmagnetic material.

4. A magneto-optical storage medium as claimed in claim 2, wherein:

said isolation layers comprises tantalum as said nonmagnetic material.

5. A magneto-optical overwrite system comprising:

a magneto-optical storage medium comprised of first, second and third magnetic layers, said first and third layers comprising an amorphous alloy consisting of a heavy rare-earth metal and a transition metal, said second magnetic layer comprising an amorphous alloy including a heavy rare-earth metal and a transition metal having no compensation-temperature at least in the range of the room temperature to its Curie-temperature Tc2, an isolation layer comprised of a nonmagnetic material interposed between said first and second magnetic layers for isolating magnetic exchange interaction between said first and second magnetic layers, a coercivity Hc1 of said first magnetic layer and a coercivity Hc2 of said second magnetic layer and a coercivity Hc3 of said third magnetic layer having a relationship Hc1>Hc3>Hc2 at room temperature, a Curie-temperature Tc1 of said first magnetic layer, said Curie-temperature Tc2 of said second magnetic layer and a Curie-temperature Tc3 of said third magnetic layer, each of which is higher than room temperature, having a relationship Tc1<Tc2<Tc3, and a substrate for supporting said first, second and third magnetic layers and said isolation layer, said third magnetic layer being magnetized in a direction and to such an extent that, at room temperature, the magnetization of the third magnetic layer will change a direction of a magnetization of said second magnetic layer, but won't change a direction of a magnetization of said first magnetic layer, and that the magnetization of the third magnetic layer does not effect the directions of magnetizations of said first and said second layers at said temperature Tc3;

laser means for generating a laser beam which varies its intensity according to a signal having a first level and a second level in correspondence with a binary-code, for irradiating said layers to provide said temperature Tc1 at said first magnetic layer and said temperature Tc2 at said second magnetic layer;

optical head means for projecting said laser beam onto said magneto-optical storage medium by converging said laser beam modulated in intensity into said first level and said second level to form spotted portions in said first and second magnetic layers in said magneto-optical storage medium, said first level causing the temperature of said spotted portion of said first magnetic layer to rise above said Curie-temperature Tc1 and causing the temperature of said spotted portion of said second magnetic layer to rise below said Curie-temperature Tc2 so that said spotted portion of said first magnetic layer only is demagnetized, said second level causing the temperature of said spotted portions of said first and second magnetic layers to rise above said Curie-temperature Tc1 and Tc2, respectively, so that both said spotted portions are demagnetized; and means for moving said magneto-optical storage medium with respect to said laser beam;

so that upon cooling of said spotted portions below the Curie-temperature Tc1, the portion of said first magnetic layer spotted by said first level is magnetized in a direction identical to the direction of magnetization of said first magnetic layer, and the portion of said first magnetic layer spotted by said second level is magnetized in a direction opposite to the direction of magnetization of said first magnetic layer.

6. A magneto-optical storage medium as claimed in claim 5, and further comprising:

an intermediate layer of nonmagnetic material interposed between said substrate and said first magnetic layer; and a second isolation layer of a nonmagnetic material interposed between said second and third magnetic layers.

7. A magneto-optical storage medium as claimed in claim 5, wherein:

said isolation layer comprises tantalum as said nonmagnetic material.

8. A magneto-optical storage medium as claimed in claim 6, wherein:

said isolation layers comprises tantalum as said nonmagnetic material.

* * * * *